US012088993B2

(12) United States Patent
Liu et al.

(10) Patent No.: US 12,088,993 B2
(45) Date of Patent: Sep. 10, 2024

(54) ACOUSTIC DEVICE

(71) Applicant: AAC Microtech (Changzhou) Co., Ltd., Changzhou (CN)

(72) Inventors: Shasha Liu, Shenzhen (CN); Xiaodong Liu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 152 days.

(21) Appl. No.: 17/876,519

(22) Filed: Jul. 28, 2022

(65) Prior Publication Data

US 2023/0209247 A1 Jun. 29, 2023

(30) Foreign Application Priority Data

Dec. 23, 2021 (CN) ........................ 202123271025.X

(51) Int. Cl.
*H04R 1/28* (2006.01)

(52) U.S. Cl.
CPC ........... *H04R 1/2803* (2013.01); *H04R 1/288* (2013.01)

(58) Field of Classification Search
CPC ..... H04R 1/2803; H04R 1/288; H04R 1/2823
See application file for complete search history.

(56) References Cited

FOREIGN PATENT DOCUMENTS

CN 212278463 U * 1/2021
CN 214507324 U * 10/2021

* cited by examiner

*Primary Examiner* — Sunita Joshi
(74) *Attorney, Agent, or Firm* — W&G Law Group

(57) ABSTRACT

Provided is an acoustic device having front and rear surfaces, and the front surface has sound outlet. The acoustic device includes: a metal enclosure housing; an acoustic component mounted in the housing, the acoustic component and the enclosure housing cooperate to form front and rear sound cavities, and the front sound cavity is communicated with the sound outlet; and an isolation component mounted in the rear sound cavity, and the isolation component and the enclosure housing enclose to define a filling cavity filled with sound-absorbing material. The isolation component closely fits outer surface of the acoustic component, the isolation component is provided with hollow portion to enable the outer surface of the acoustic component to be exposed to the filling cavity, and the hollow portion is filled with the sound-absorbing material. With the arrangement of the hollow portion, the acoustic device is filled with more sound-absorbing material, improving acoustic performance.

9 Claims, 8 Drawing Sheets

A-A

ACOUSTIC DEVICE

TECHNICAL FIELD

The present disclosure relates to the field of acoustoelectric conversion technologies and, in particular, to an acoustic device.

BACKGROUND

An acoustic device is widely used in a variety of electronic devices and generally includes an acoustic component for producing sound and an enclosure housing covering the acoustic component. The acoustic component and the enclosure housing are matched to form a front sound cavity and a rear sound cavity. The rear sound cavity is provided with a filling cavity configured to be filled with a sound-absorbing material, so as to enlarge the rear sound cavity of the acoustic device, which is an effective way to improve acoustic performance.

In the related art, the rear sound cavity is generally provided with an air-permeable isolation member fixed to the enclosure housing. The enclosure housing and the air-permeable isolation member together define a filling cavity configured to be filled with the sound-absorbing material. With the arrangement, the air-permeable isolation member occupies part of the space in the rear sound cavity, which reduces a filling space for the sound-absorbing material, thereby limiting the improvement in the acoustic performance.

SUMMARY

The present disclosure provides an acoustic device, so as to solve the problem of a small filling space for the sound-absorbing material in the existing acoustic device.

The present disclosure provides an acoustic device, the acoustic device has a front surface and a rear surface, and the front surface is provided with a sound outlet. The acoustic device includes: an enclosure housing that is a metal housing; an acoustic component mounted in the enclosure housing, the acoustic component and the enclosure housing cooperate to form a front sound cavity and a rear sound cavity, and the front sound cavity is communicated with the sound outlet; and an isolation component mounted in the rear sound cavity, and the isolation component and the enclosure housing enclose to define a filling cavity configured to be filled with a sound-absorbing material. The isolation component closely fits at least one outer surface of the acoustic component, the isolation component is provided with a hollow portion to enable the outer surface of the acoustic component to be exposed to the filling cavity, and the hollow portion is also configured to be filled with a sound-absorbing material.

As an improvement, the enclosure housing includes a front wall located on the front surface, a bottom wall located on the rear surface, and a side wall connecting the front wall and the bottom wall, and the acoustic component is spaced from the bottom wall of the enclosure housing and has a bottom-side outer surface opposite to the bottom wall. The isolation component closely fits the bottom-side outer surface and is fixedly connected to the side wall of the enclosure housing to mount the acoustic component in the enclosure housing. The isolation component divides the rear sound cavity into a first rear sound cavity close to the front surface and a second rear sound cavity close to the rear surface. The hollow portion is arranged at a position where the isolation component closely fits the bottom-side outer surface, to enable the bottom-side outer surface to be exposed to the second rear sound cavity, and the second rear sound cavity is the filling cavity.

As an improvement, the isolation component is further provided with an air-permeable portion to communicate with the first rear sound cavity and the second rear sound cavity.

As an improvement, the isolation component includes a support member and is fixedly connected to the enclosure housing through the support member, and the support member is provided with a first opening and a second opening. The isolation component further includes an air-permeable isolation member, the air-permeable isolation member is attached to the support member and covers the first opening to form the air-permeable portion. The air-permeable isolation member is provided with a third opening, and the third opening is directly penetrated to the second opening to form the hollow portion.

As an improvement, the support member includes at least one plate portion having a plate structure, and the first opening and the second opening are arranged on the plate portion.

As an improvement, the air-permeable isolation member includes a first part attached to one side of the plate portion close to the rear surface and a second part bending from the first part towards the front surface and extending into the first opening.

As an improvement, the air-permeable isolation member is attached to one side of the plate portion close to the front surface, and the air-permeable isolation member has a plate structure.

As an improvement, the support member is made of stainless steel or carbon steel.

As an improvement, the air-permeable isolation member has a mesh structure.

As an improvement, the acoustic component includes an acoustic unit and a front cover covering one side of the acoustic unit close to the front surface, and the front cover is provided with the sound outlet. The acoustic unit includes a diaphragm opposite to the front cover, the diaphragm and the front cover enclose to define the front sound cavity, and one side of the diaphragm close to the rear surface and the enclosure housing enclose to define the rear sound cavity.

The present disclosure has the following beneficial effects.

The support member and the air-permeable isolation member are matched to form a hollow portion, so that more space in the acoustic component can be used to be filled with the sound-absorbing material, thereby improving sound-absorbing performance. At the same time, since the support member is provided with a first opening to enable the air-permeable isolation member to extend into the first opening, the volume of the filling cavity is increased, which helps to fill the filling cavity with more of the sound-absorbing material, thereby further improving the sound-absorbing performance.

It is to be understood that the general description above and the detailed description below are only examples and cannot limit the present disclosure.

The accompanying drawings herein are incorporated in and constitute a part of this specification, illustrate embodiments consistent with the present disclosure and, together with the description, serve to explain the principles of the present disclosure.

DESCRIPTION OF EMBODIMENTS

In order to better understand the technical solution of the present disclosure, embodiments of the present disclosure are described in detail below with reference to the accompanying drawings.

It should be made clear that the embodiments described are only some rather than all of the embodiments of the present disclosure. All other embodiments acquired by those of ordinary skill in the art without creative efforts based on the embodiments in the present disclosure fall within the protection scope of the present disclosure.

The terms used in the embodiments of the present disclosure are intended only to describe particular embodiments and are not intended to limit the present disclosure. As used in the embodiments of the present disclosure and the appended claims, the singular forms of "a/an", "said", and "the" are intended to include plural forms, unless otherwise clearly specified by the context.

It is to be understood that the term "and/or" used herein is merely an association relationship describing associated objects, indicating that three relationships may exist. For example, A and/or B indicates that there are three cases of A alone, A and B together, and B alone. In addition, the character "/" herein generally means that associated objects before and after "/" are in an "or" relationship.

It is to be noted that the location terms such as "above", "below", "left", and "right" described in the embodiments of the present disclosure are described with reference to the perspectives shown in the accompanying drawings, and should not be construed as limitations on the embodiments of the present disclosure. In addition, in the context, it is to be further understood that, when one element is referred to as being connected "above" or "below" another element, the one element may be directly connected "above" or "below" another element, or connected "above" or "below" another element via an intermediate element.

Embodiment 1

According to Embodiment of the present disclosure, as shown in FIG. 1 to FIG. 9, an acoustic device 100 has a front surface 100A and a rear surface 100B. The front surface 100A is a sound output surface.

Figure 3:
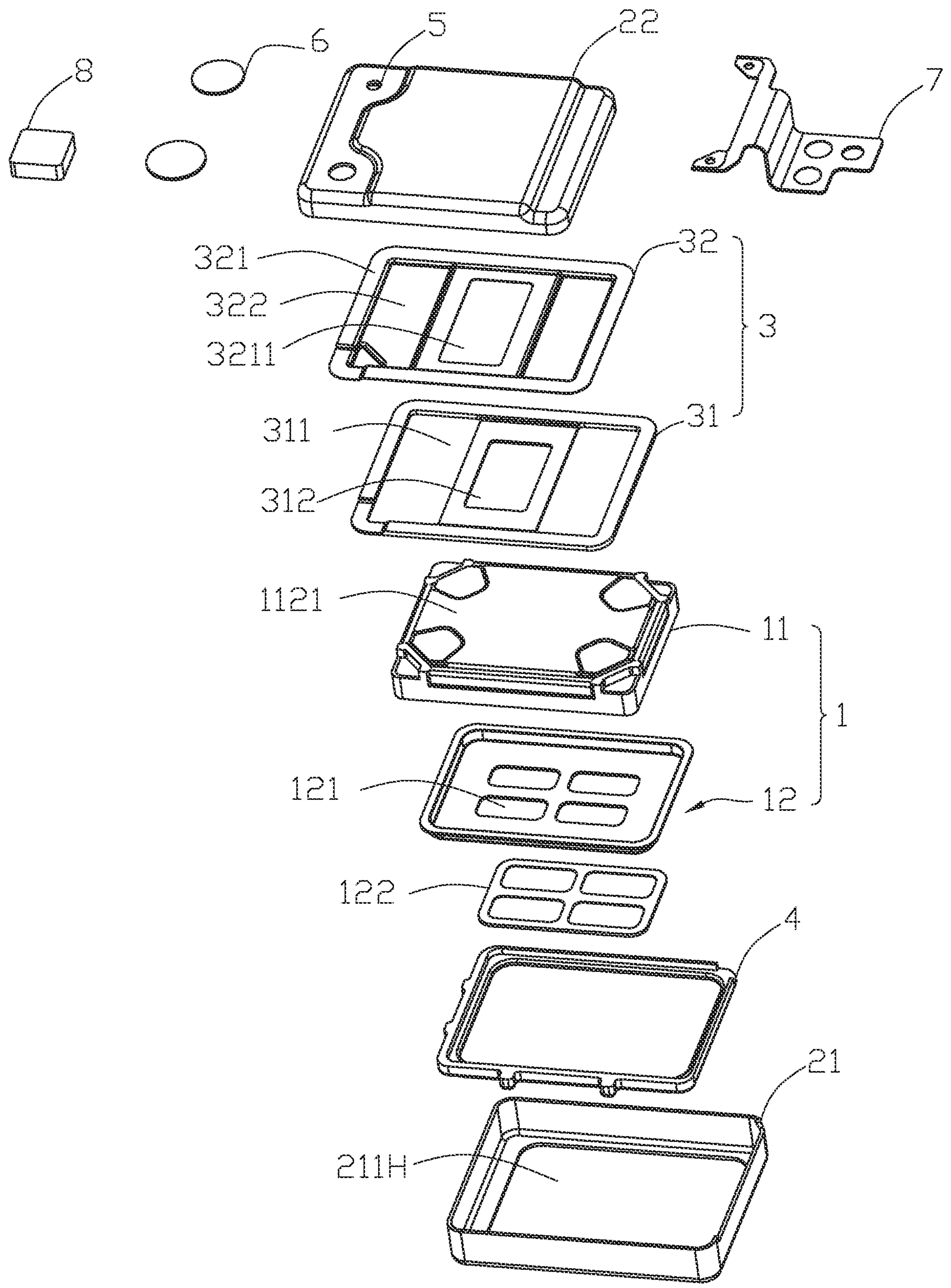
FIG. 3 is an exploded view of an acoustic device according to Embodiment 1 of the present disclosure from one perspective.
Figure 4:
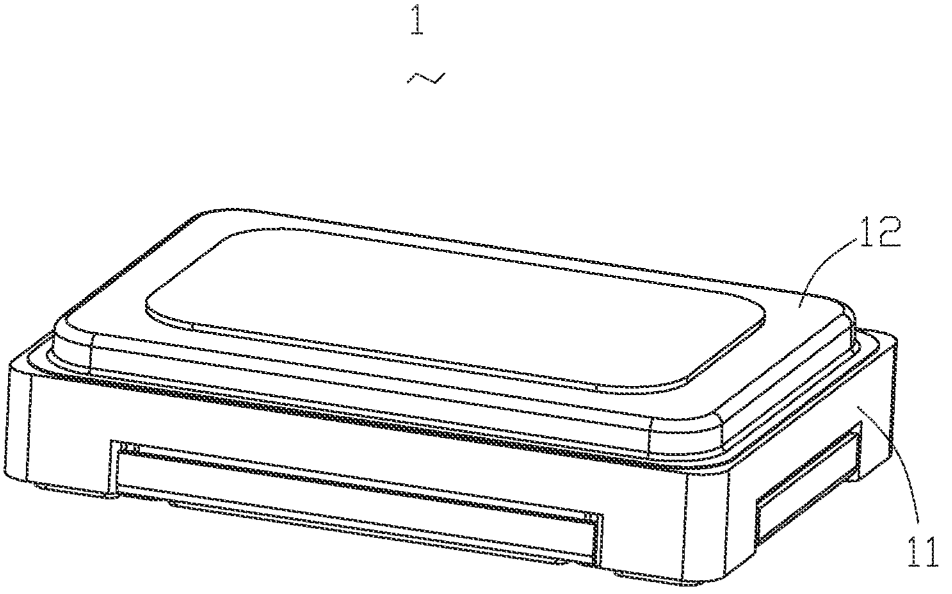
FIG. 4 is a schematic diagram of a three-dimensional structure of an acoustic component of an acoustic device according to Embodiment 1 of the present disclosure.
Figure 5:
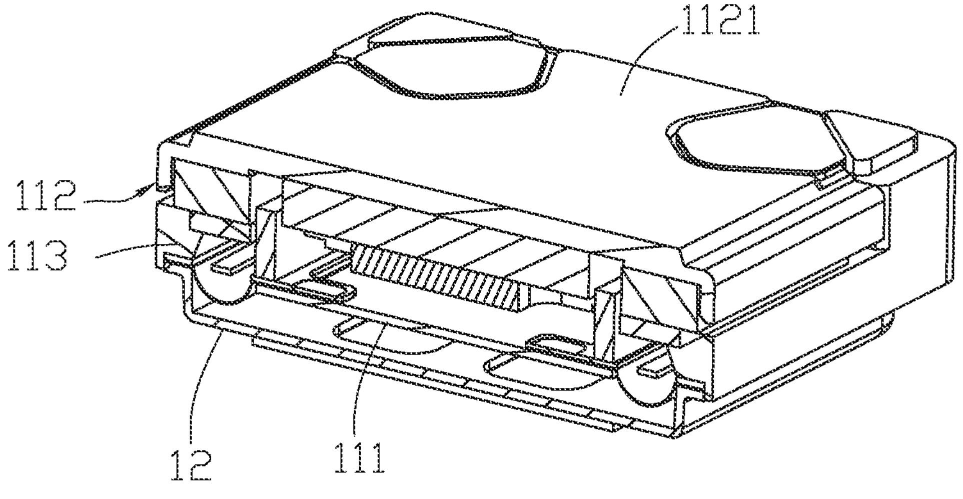
FIG. 5 is a three-dimensional sectional view of an acoustic component of an acoustic device according to Embodiment 1 of the present disclosure.

As shown in FIG. 3 to FIG. 5, the acoustic device 100 includes an acoustic component 1 for vibrating to produce sound. The acoustic component 1 includes an acoustic unit 11 and a front cover 12 covering one side of the acoustic unit 11 close to the front surface 100A. The front cover 12 is provided with a sound outlet 121 and an air-permeable mesh 122 covering the sound outlet 121. The acoustic unit 11 includes a diaphragm 111 for vibrating, a magnetic circuit unit 112 to drive the diaphragm 111 to vibrate, and a frame 113 to support the diaphragm 111 and the magnetic circuit unit 112. The magnetic circuit unit 112 has a bottom-side outer surface 1121. The bottom-side outer surface 1121 is a flat plane.

As shown in FIG. 1 to FIG. 3 and FIG. 6 to FIG. 7, the acoustic device 100 further includes an enclosure housing 2 covering the acoustic component 1. The enclosure housing 2 is a metal housing, including a first housing 21 close to the front surface 100A and a second housing 22 close to the rear surface 100B. The first housing 21 and the second housing 22 are matched to form a space to receive the acoustic component 1. The first housing 21 has a front wall 211 close to the front surface 100A and a first side wall 212 extending from the front wall 211 to the rear surface 100B. The front wall 211 is provided with an avoiding opening 211H. The second housing 22 has a bottom wall 221 opposite to the front wall 211 and a second side wall 222 extending from the bottom wall 221 to the front surface 100A. The first side wall 212 and the second side wall 222 are formed as side walls of the enclosure housing 2. It is to be noted that, the present disclosure does not limit the number and structure of parts forming the enclosure housing 2, as long as a receiving space can be formed.

Figure 6:
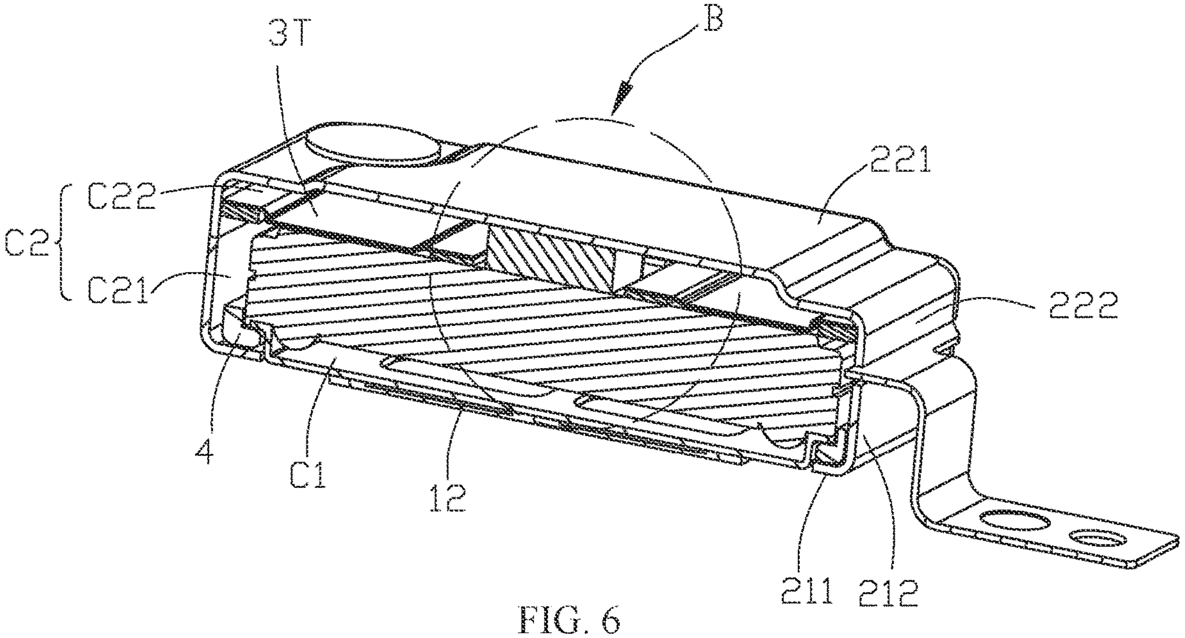
FIG. 6 is a three-dimensional sectional view of an acoustic device according to Embodiment 1 of the present disclosure.
Figure 7:
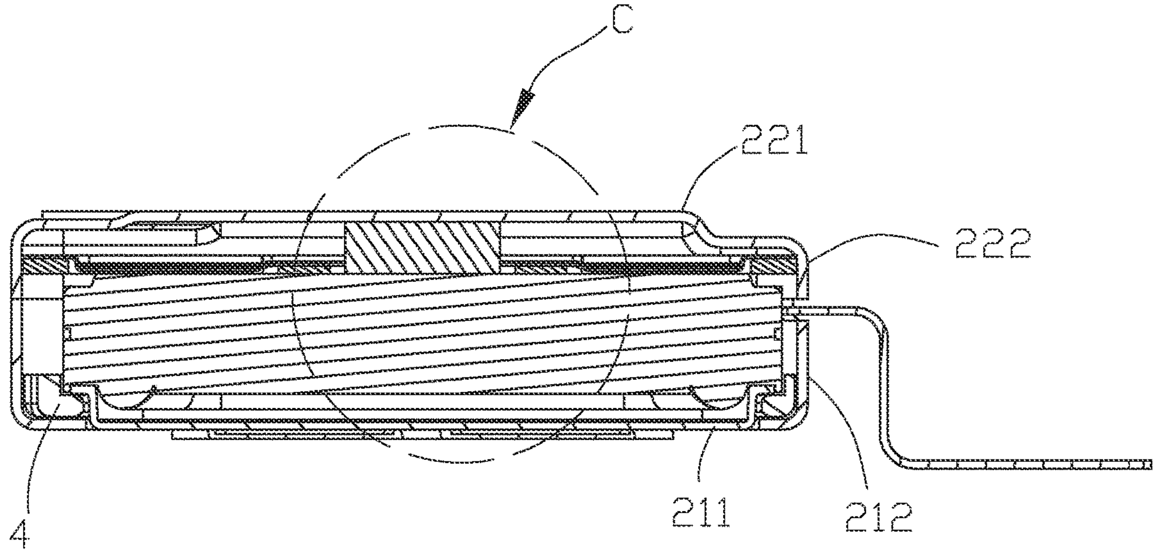
FIG. 7 is a sectional view taken along a direction A-A in FIG. 2.
Figure 8:
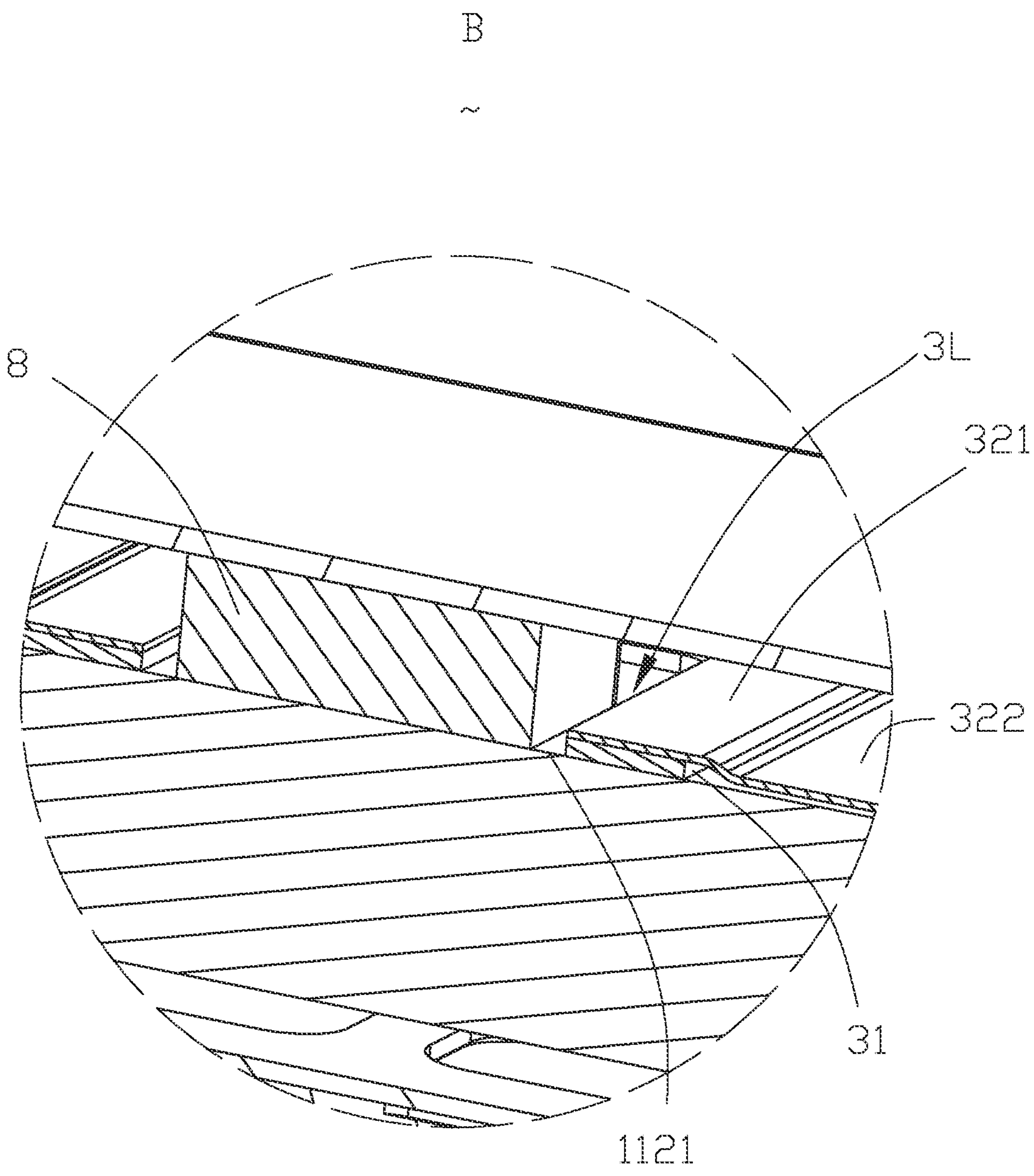
FIG. 8 is a partial enlarged view of FIG. 6.
Figure 9:
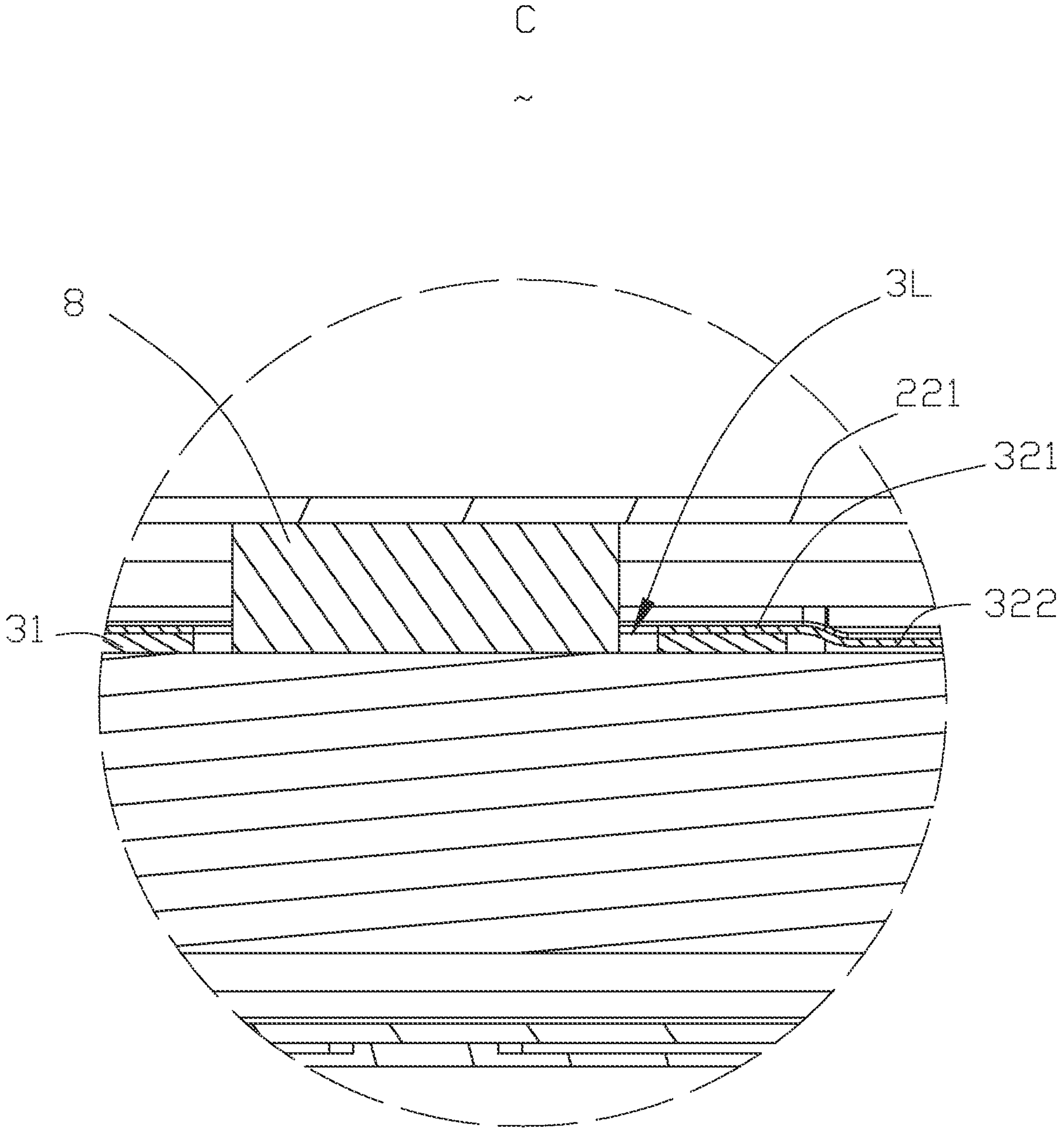
FIG. 9 is a partial enlarged view of FIG. 7.

As shown in FIG. 3 and FIG. 6 to FIG. 7, after the acoustic component 11 is mounted to the enclosure housing 2, the front cover 12 of the acoustic component 1 is received in the avoiding opening 211H of the enclosure housing 2. The bottom-side outer surface 1121 of the acoustic component 1 is opposite to and spaced from the bottom wall 221 of the enclosure housing 2. The diaphragm 111 of the acoustic component 1 is opposite to the front cover 12 and together define a front sound cavity C1. One side of the diaphragm 111 close to the rear surface 100B defines a rear sound cavity C2 together with the enclosure housing 2.

As shown in FIG. 3 and FIG. 6 to FIG. 9, the acoustic device 100 further includes an isolation component 3. The isolation component 3 includes a support member 31. The support member 31 has a plate structure, provided with a first opening 311 and a second opening 312. The support member 31 is made of stainless steel or carbon steel. The isolation component 3 further includes an air-permeable isolation member 32. The air-permeable isolation member 32 has a mesh structure, including a first part 321 attached to one side of the support member 31 close to the rear surface 100B and a second part 322 bending from the first part 321 towards the front surface 100A and extending into the first opening 311. The second part 322 of the air-permeable isolation member 32 covers the first opening 311, forming an air-permeable portion 3T. The first part 321 of the air-permeable isolation member 32 is provided with a third opening 3211, and the third opening 3211 is directly penetrated to the second opening 312, forming a hollow portion 3L. The air-permeable isolation member 32 is attached to the support member 31 by an adhesive. It is to be noted that, the present disclosure does not limit the shape of the support member, which has at least one plate portion of a plate structure. The first opening and the second opening are provided on the plate portion.

As shown in FIG. 3 and FIG. 6 to FIG. 9, in an embodiment, the isolation component 3 closely contacts the bottom-side outer surface 1121 of the acoustic component 1 and is fixedly connected to the side wall of the enclosure housing 2 through the support member 31, to mount the acoustic component 1 in the enclosure housing 2. The isolation component 3 divides the rear sound cavity C2 into a first rear sound cavity C21 close to the front surface 100A and a second rear sound cavity C22 close to the rear surface 100B. The hollow portion 3L is arranged at a position where the isolation component 3 contacts the bottom-side outer surface 1121 of the acoustic component 1, to enable the bottom-side outer surface 1121 to be exposed to the second rear sound cavity C22. The air-permeable portion 3T of the isolation component 2 is communicated with the first rear sound cavity C21 and the second rear sound cavity C22. That is, sound in the first rear sound cavity C21 can be propagated to the second rear sound cavity C22 through the air-permeable portion 3T.

The second rear sound cavity C22 is formed as a filling cavity to be filled with a sound-absorbing material. The hollow portion 3L is also configured to be filled with the sound-absorbing material to increase the filling volume of the sound-absorbing material.

As shown in FIG. 3 and FIG. 6 to FIG. 7, the acoustic device 100 further includes a cushion edge 4 assembled in the enclosure housing 2, for mounting the acoustic component 1. The cushion edge 4 is arranged on an inner side of the front wall 211 of the first housing 21 and is fixed to an edge of the front cover 12. The cushion edge 4 has a plastic structure and easily shaped. Matching of the cushion edge with the metallic enclosure housing 2 is more conducive to mounting and fixing the acoustic device. It is to be noted that, the present disclosure neither limits the use of the cushion edge nor limits the structure and material of the cushion edge.

Figure 1:
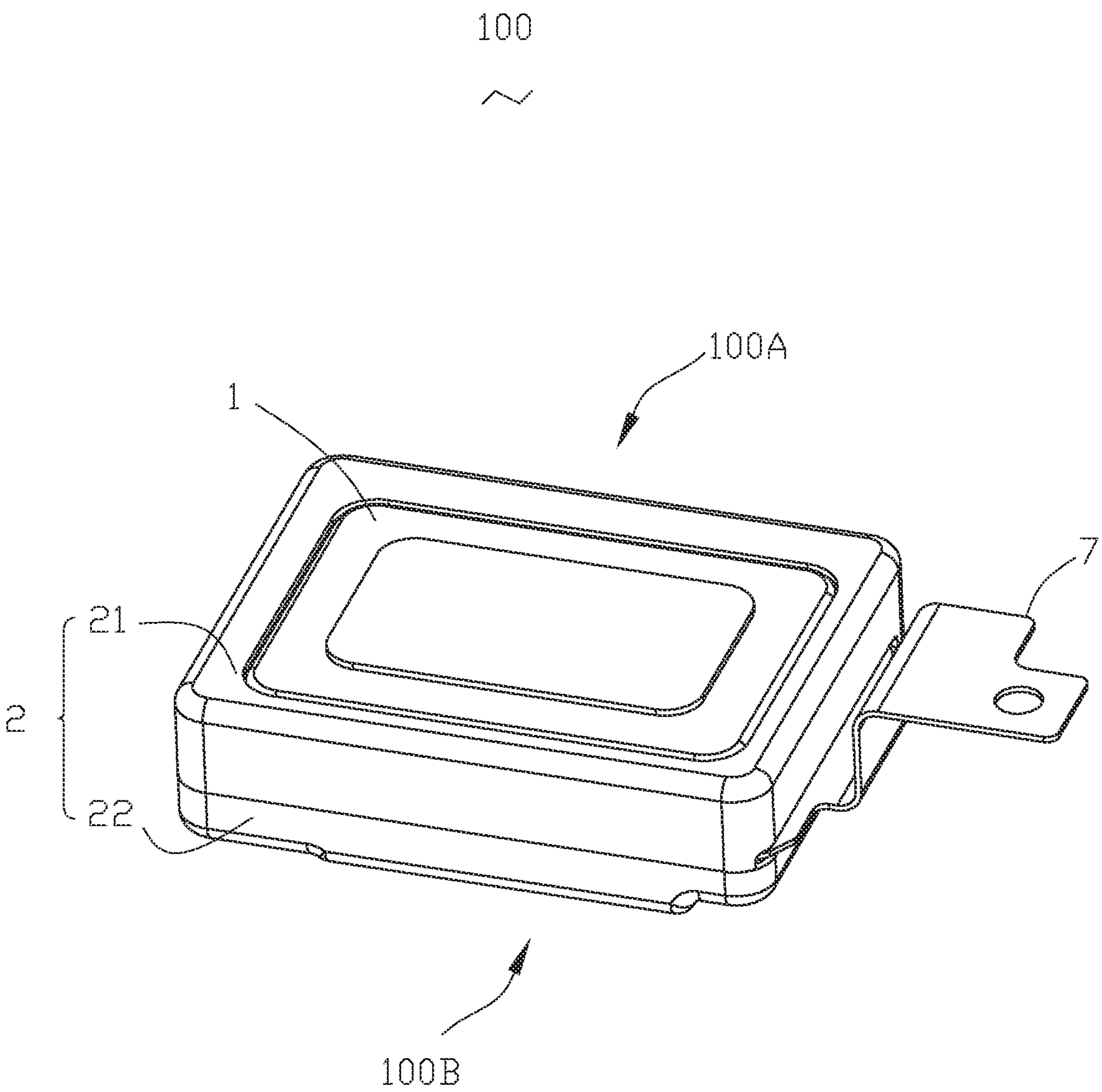
FIG. 1 is a schematic diagram of a three-dimensional structure of an acoustic device according to Embodiment 1 of the present disclosure from one perspective.
Figure 2:
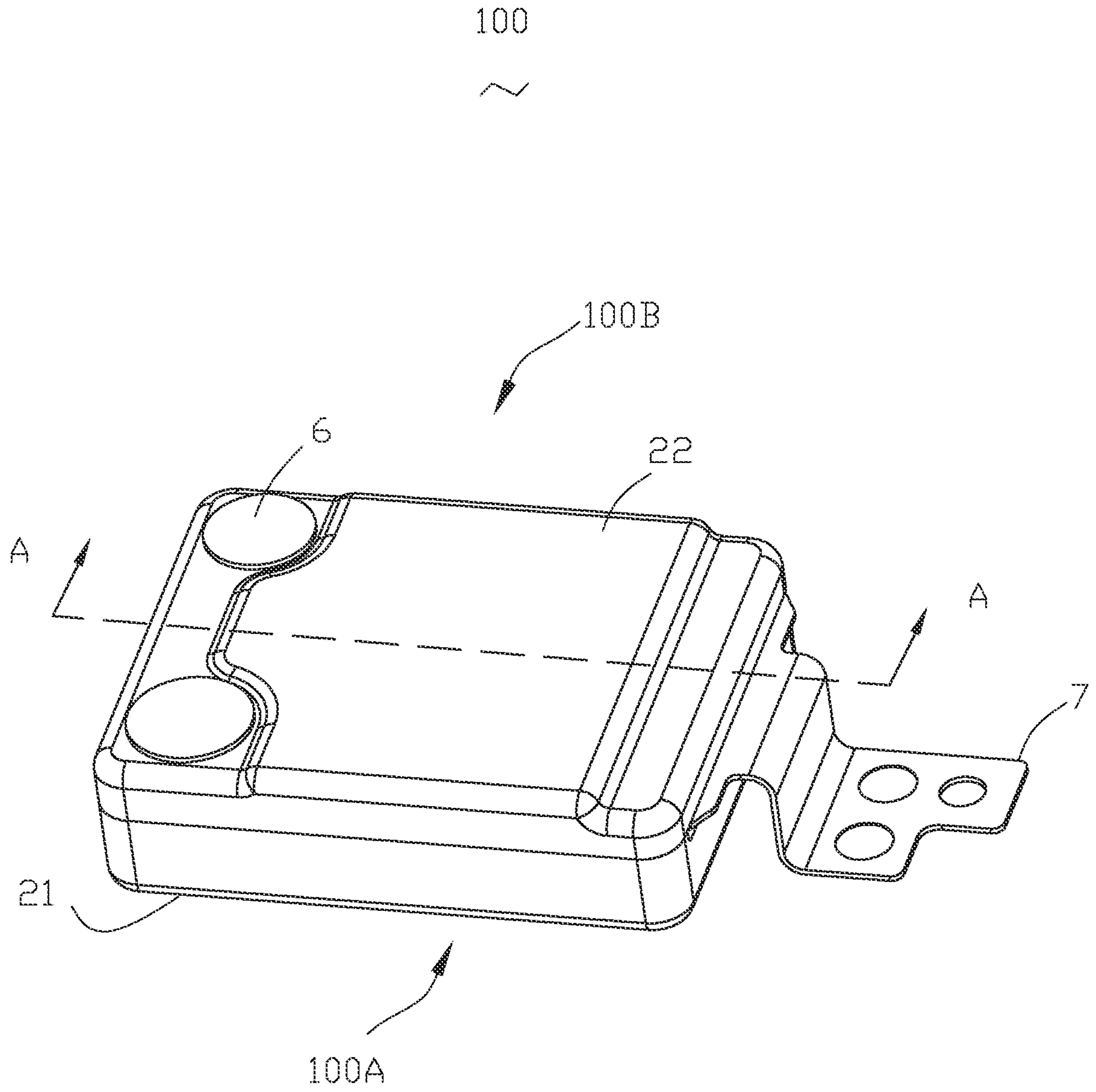
FIG. 2 is a schematic diagram of a three-dimensional structure of an acoustic device according to Embodiment 1 of the present disclosure from another perspective.

As shown in FIG. 1 to FIG. 3, the acoustic device 100 further includes a filling hole 5 provided on the bottom wall 221 of the enclosure housing 2 and a hole cover 6 covering the filling hole 5. During the filling of the sound-absorbing material, the filling cavity C22 and the hollow portion 3L are filled with the sound-absorbing material via the filling hole 5. After the filling of the sound-absorbing material is completed, the filling hole is covered with the hole cover 6.

As shown in FIG. 1 to FIG. 3, the acoustic device 100 further includes a circuit board 7 for connection with an external circuit. The circuit board 7 extends from the interior of the enclosure housing 2 to the exterior of the enclosure housing 2.

As shown in FIG. 3 and FIG. 6 to FIG. 9, the acoustic device 100 further includes a stop 8 sandwiched between the acoustic component 1 and the bottom wall 221 of the enclosure housing. The stop 8 is a damper that may be configured to restrict a position of the acoustic component 1 to prevent fall-off. In an embodiment, the stop 8 is partially received in a hollow portion 3L. It is to be noted that, the present disclosure does not limit the use of the stop. When the stop is not used, more space can be saved to be filled with the sound-absorbing material.

In this embodiment, the support member and the air-permeable isolation member are matched to form a hollow portion, so that more space in the acoustic component can be used to be filled with the sound-absorbing material, thereby improving sound-absorbing performance. At the same time, since the support member is provided with a first opening to enable the air-permeable isolation member to extend into the first opening, the volume of the filling cavity is increased, which helps to fill the filling cavity with more of the sound-absorbing material, thereby further improving the sound-absorbing performance. In addition, the support member has a plate structure with a small thickness. The first part of the air-permeable isolation member is attached to the surface of the plate structure, and the second part is located in the first opening of the plate structure. The air-permeable isolation member is of a 3D structure as a whole, but has a small thickness, which is easy to form and will not easily break during the processing.

Embodiment 2

Figure 10:
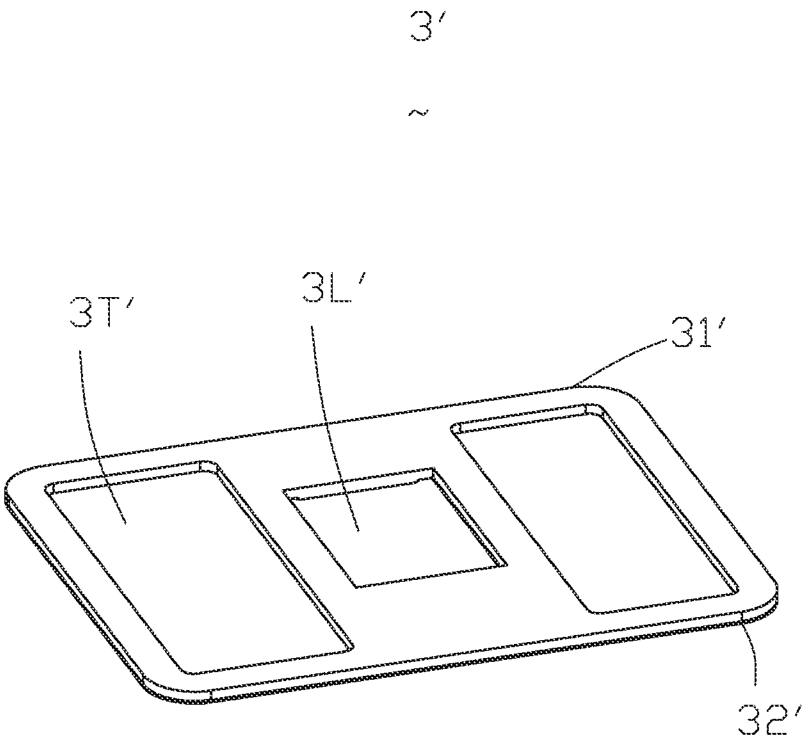
FIG. 10 is a schematic diagram of a three-dimensional structure of an isolation component of an acoustic device according to Embodiment 2 of the present disclosure.
Figure 11:
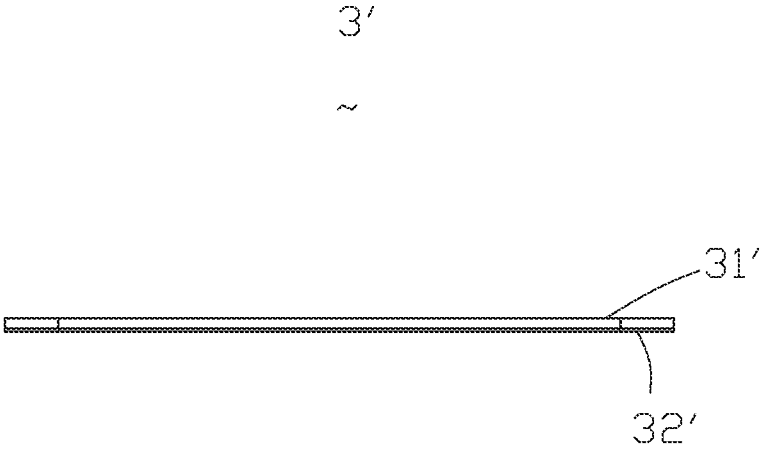
FIG. 11 is a side view of an isolation component of an acoustic device according to Embodiment 2 of the present disclosure.

According to Embodiment 2 of the present disclosure, as shown in FIG. 10 to FIG. 11, an isolation component 3' includes a support member 31' and an air-permeable isolation member 32'. The air-permeable isolation member 32' has a plate structure and the air-permeable isolation member 32' is attached to one side of the support member 31' close to the front surface 100A. That is, when the isolation component 3' is mounted in the enclosure housing, the air-permeable isolation member 32' closely contacts the bottom-side outer surface of the acoustic component. The isolation component 3' is provided with a hollow portion 3L' and an air-permeable portion 3T'. Functions of the hollow portion 3L' and the air-permeable portion 3T' are the same as those of the hollow portion 3L and the air-permeable portion 3T, and are not repeated herein.

In this embodiment, except the isolation component 3', other structures are all the same as those in Embodiment 1, and are not repeated herein.

In this embodiment, the air-permeable isolation member 32' has a plate structure, which is more easily molded and less prone to breakage than Embodiment 1.

The above are only preferred embodiments of the present disclosure and are not intended to limit the present disclosure. For those skilled in the art, the present disclosure may be subject to various modifications and changes. Any modification, equivalent replacement, improvement and the like within the spirit and principle of the present disclosure all fall within the protection scope of the present disclosure.

What is claimed is:

1. An acoustic device, wherein the acoustic device has a front surface and a rear surface, the front surface is provided with a sound outlet, and the acoustic device comprises:

an enclosure housing that is a metal housing;

an acoustic component mounted in the enclosure housing, wherein the acoustic component and the enclosure housing cooperate to form a front sound cavity and a rear sound cavity, and the front sound cavity is communicated with the sound outlet; and an isolation component mounted in the rear sound cavity, and the isolation component and the enclosure housing enclose to define a filling cavity configured to be filled with a sound-absorbing material, wherein the isolation component closely fits at least one outer surface of the acoustic component, the isolation component is provided with a hollow portion to enable the outer surface of the acoustic component to be exposed to the filling cavity, and the hollow portion is also configured to be filled with a sound-absorbing material;

wherein the acoustic component comprises an acoustic unit and a front cover covering one side of the acoustic unit close to the front surface, and the front cover is provided with the sound outlet; and the acoustic unit comprises a diaphragm opposite to the front cover, the diaphragm and the front cover enclose to define the front sound cavity, and one side of the diaphragm close to the rear surface and the enclosure housing enclose to define the rear sound cavity.

2. The acoustic device as described in claim 1, wherein the enclosure housing comprises a front wall located on the front surface, a bottom wall located on the rear surface, and a side wall connecting the front wall and the bottom wall, and the acoustic component is spaced from the bottom wall of the enclosure housing and has a bottom-side outer surface opposite to the bottom wall;

the isolation component closely fits the bottom-side outer surface and is fixedly connected to the side wall of the enclosure housing to mount the acoustic component in the enclosure housing; and the isolation component divides the rear sound cavity into a first rear sound cavity close to the front surface and a second rear sound cavity close to the rear surface; and the hollow portion is arranged at a position where the isolation component closely fits the bottom-side outer surface, to enable the bottom-side outer surface to be exposed to the second rear sound cavity, and the second rear sound cavity is the filling cavity.

3. The acoustic device as described in claim 2, wherein the isolation component is further provided with an air-permeable portion to communicate with the first rear sound cavity and the second rear sound cavity.

4. The acoustic device as described in claim 3, wherein the isolation component comprises a support member and is fixedly connected to the enclosure housing through the support member, and the support member is provided with a first opening and a second opening;

the isolation component further comprises an air-permeable isolation member, and the air-permeable isolation member is attached to the support member and covers the first opening to form the air-permeable portion; and the air-permeable isolation member is provided with a third opening, and the third opening is directly penetrated to the second opening to form the hollow portion.

5. The acoustic device as described in claim 4, wherein the support member comprises at least one plate portion having a plate structure, and the first opening and the second opening are arranged on the plate portion.

6. The acoustic device as described in claim 5, wherein the air-permeable isolation member comprises a first part attached to one side of the plate portion close to the rear surface and a second part bending from the first part towards the front surface and extending into the first opening.

7. The acoustic device as described in claim 5, wherein the air-permeable isolation member is attached to one side of the plate portion close to the front surface, and the air-permeable isolation member has a plate structure.

8. The acoustic device as described in claim 4, wherein the support member is made of stainless steel or carbon steel.

9. The acoustic device as described in claim 4, wherein the air-permeable isolation member has a mesh structure.

* * * * *